United States Patent
Ha et al.

(10) Patent No.: US 9,909,618 B2
(45) Date of Patent: Mar. 6, 2018

(54) THRUST BEARING FOR VEHICLE AIR COMPRESSOR

(71) Applicants: Hyundai Motor Company, Seoul (KR); Kia Motors Corporation, Seoul (KR); Kookmin University Industry Academy Cooperation Foundation, Seoul (KR)

(72) Inventors: Kyoung Ku Ha, Gyeonggi-Do (KR); Chang Ha Lee, Gyeonggi-Do (KR); Jeong Hee Park, Gyeonggi-do (KR); Tae Ho Kim, Gyeonggi-Do (KR); Moon Sung Park, Seoul (KR); Jong Sung Lee, Seoul (KR); Young Min Kim, Gyeonggi-Do (KR)

(73) Assignees: Hyundai Motor Company, Seoul (KR); Kia Motors Corporation, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 15/335,001

(22) Filed: Oct. 26, 2016

(65) Prior Publication Data

US 2017/0321744 A1    Nov. 9, 2017

(30) Foreign Application Priority Data

May 9, 2016 (KR) .................. 10-2016-0056093

(51) Int. Cl.
*F16C 17/04* (2006.01)
*F16C 39/02* (2006.01)

(52) U.S. Cl.
CPC ............ *F16C 17/042* (2013.01); *F16C 39/02* (2013.01); *F16C 2360/00* (2013.01)

(58) Field of Classification Search
CPC ..... F16C 17/04; F16C 17/042; F16C 2360/00
See application file for complete search history.

(56) References Cited

U.S. PATENT DOCUMENTS 3,375,046 A * 3/1968 Marley ................ F16C 17/042
                                                        384/105
3,382,014 A * 5/1968 Marley ................ F16C 17/024
                                                        384/106

(Continued)

FOREIGN PATENT DOCUMENTS

JP           4576746 B2 * 11/2010  ............ F16C 17/042
JP        2013-044394        3/2013

(Continued)

*Primary Examiner* — Alan B Waits
(74) *Attorney, Agent, or Firm* — Mintz Levin Cohn Ferris Glovsky and Popeo, P.C.; Peter F. Corless

(57) ABSTRACT

A thrust bearing includes: a thrust plate in a disc shape having an outer diameter and an inner diameter formed by perforating a central portion of the thrust plate; a plurality of bump foils disposed radially on a top surface of the thrust plate; a plurality of top foils in a panel shape covering each of the bump foils, where bottom surfaces of the top foils are in contact with upper ends of the bump foils; and metal blocks radially disposed on the top surface of the thrust plate and formed to be spaced apart from the bump foils. The thrust bearing can be included in an air compressor of a vehicle.

7 Claims, 7 Drawing Sheets

(56) References Cited

U.S. PATENT DOCUMENTS

| | | | | |
|---|---|---|---|---|
| 4,227,752 A * | 10/1980 | Wilcock | ............... | F16C 17/042 |
| | | | | 384/106 |
| 7,261,300 B2 * | 8/2007 | Agrawal | ............... | F16C 17/042 |
| | | | | 277/399 |
| 9,157,472 B2 * | 10/2015 | Kim | ..................... | F16C 17/042 |
| 9,188,157 B2 * | 11/2015 | Blechschmidt | ..... | F16C 33/1075 |
| 9,677,609 B2 * | 6/2017 | Omori | .................. | F01D 25/168 |
| 2015/0330443 A1 * | 11/2015 | Omori | .................. | F01D 25/168 |
| | | | | 384/223 |
| 2016/0195128 A1 * | 7/2016 | Omori | .................. | F16C 17/042 |
| | | | | 384/105 |
| 2016/0195129 A1 * | 7/2016 | Omori | .................. | F16C 17/042 |
| | | | | 384/105 |

FOREIGN PATENT DOCUMENTS

| | | | |
|---|---|---|---|
| JP | 2014-085006 A | | 5/2014 |
| JP | 2015-140909 | | 8/2015 |
| KR | 10-2015-0052314 | | 9/2016 |
| WO | 2011-043607 A2 | | 4/2011 |

* cited by examiner

THRUST BEARING FOR VEHICLE AIR COMPRESSOR

CROSS REFERENCE TO RELATED APPLICATION

The present application claims under 35 U.S.C. § 119(a) the benefit of Korean Patent Application No. 10-2016-0056093 filed on May 9, 2016, the entire contents of which are incorporated by reference herein.

BACKGROUND

1. Field of the Invention

The present invention relates to a thrust bearing capable of increasing load bearing capacity and preventing permanent deformation of a bump foil by disposing metal blocks on a thrust plate to act as an additional gas dynamic pressure rigid bearing when a heavy load is applied.

2. Description of the Related Art

In a conventional gas foil thrust bearing, a thrust collar thereof is supported by gas fluid film generated between the thrust collar and a top foil when the thrust collar rotates at a state that the bearing is close thereto.

In recent years, as air compressors for vehicles have become more compact and operate at a higher speed/pressure, there have been demands for a gas foil thrust bearing having high speed stability and a high load bearing capacity.

As the foregoing described as the background art is just to promote better understanding of the background of the present invention, it must not be taken as an admission that it corresponds to the prior art well known to those who have ordinary skill in the art.

SUMMARY

The present invention provides a thrust bearing capable of increasing load bearing capacity and at the same time preventing permanent deformation of a bump foil by disposing metal blocks on a thrust plate to act as an additional gas dynamic pressure rigid bearing when a heavy load is applied. The thrust bearing may be installed in an air compressor of a vehicle.

A thrust bearing according to the present invention includes: a thrust plate in a disc shape having an outer diameter and an inner diameter formed by perforating a central portion of the thrust plate; a plurality of bump foils disposed radially on a top surface of the thrust plate; a plurality of top foils in a panel shape covering each of the bump foils, where bottom surfaces of the top foils are in contact with upper ends of the bump foils; and metal blocks radially disposed on the top surface of the thrust plate and formed to be spaced apart from the bump foils.

Each of the top foils may include an inclined portion having an inclination formed upwardly along a certain distance from the top surface of the thrust plate, of which one end is fixed to the top surface of the thrust plate, and an extension portion extended from the inclined portion of the top foil to be inclined smaller than the inclination of the inclined portion of the top foil.

Each of the metal blocks may include an inclined region having an inclination formed upwardly along a certain distance from the top surface of the thrust plate, and an extension region extended from the inclined region of the metal block to be inclined smaller than the inclination of the inclined region of the metal block.

The metal block may be paired with the top foil, the inclined region of the metal block may be formed at a position corresponding to the inclined portion of the top foil paired with the metal block, and the extension region of the metal block may be formed at a position corresponding to the extension portion of the top foil paired with the metal block.

The inclination of the inclined region of the metal block may be formed to be smaller than the inclination of the inclined portion of the top foil so that a height of the extension region of the metal block may be lower than that of the extension portion of the top foil.

The metal blocks may be spaced apart from the bump foils respectively in a direction of the outer diameter of the thrust plate and disposed along the outer diameter of the thrust plate.

The metal blocks may be spaced apart from the bump foils respectively in a direction of the inner diameter of the thrust plate and disposed along the inner diameter of the thrust plate.

The metal blocks may be spaced apart from the bump foils respectively in both directions of the inner and outer diameters of the thrust plate and disposed along the inner and outer diameters of the thrust plate.

With the thrust bearing according to the present invention as discussed above, it is possible to increase load bearing capacity and at the same time prevent permanent deformation of the bump foil by disposing the metal blocks on the thrust plate to act as an additional gas dynamic pressure rigid bearing when a heavy load is applied.

Further, as each of the metal block is formed into a shape similar to the top foil, hydrodynamic pressure is also generated between the metal block and the thrust collar when a heavy load is applied, so that additional load bearing capacity is generated. Therefore, an effect of the additional load bearing capacity is an increased stability at high speeds.

DESCRIPTION OF EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Preferred embodiments of the present invention will now be described in detail with reference to the accompanying drawings.

Figure 1:
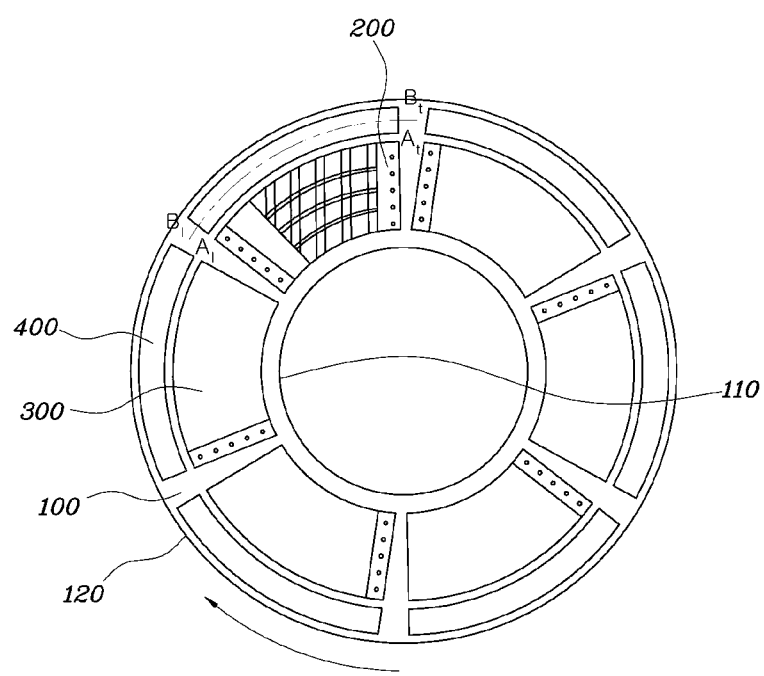
FIG. 1 is a view of a thrust bearing according to an exemplary embodiment of the present invention.
Figure 2:
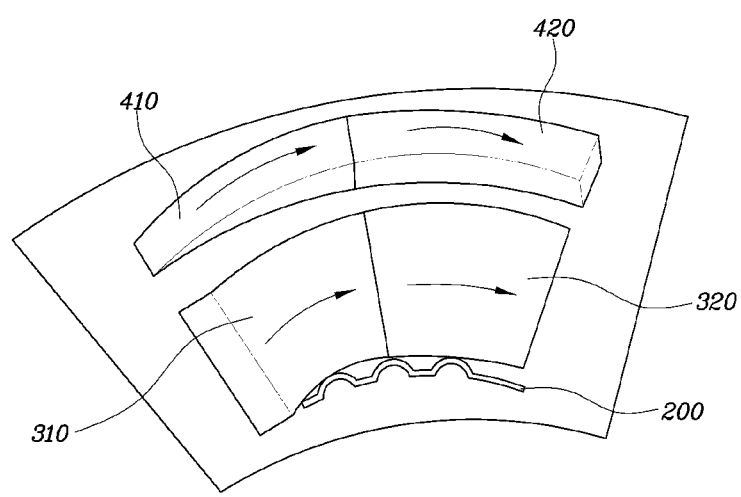
FIG. 2 is a view of top foils and metal blocks according to an exemplary embodiment of the present invention.

A thrust bearing according to the present invention includes: a thrust plate 100 in a disc shape as shown in FIGS. 1 and 2 having an outer diameter 120 and an inner diameter 110 formed by perforating a central portion of the thrust plate 100; a plurality of bump foils 200 disposed radially on a top surface of the thrust plate 100; a plurality of top foils 300 in a panel shape covering each of the bump foils 200, where bottom surfaces of the top foils are in contact with upper ends of the bump foils 200; and metal blocks 400 radially disposed on the top surface of the thrust plate 100 and formed to be spaced apart from the bump foils 200.

A through hole is perforated through and formed at the central portion of the disc-shaped thrust plate 100 made of a metallic material so that the thrust plate 100 is formed with the inner diameter 110 and the outer diameter 120.

The plurality of bump foils 200 are connected to the top surface of the thrust plate 100. Each bump foil 200 is composed of a plurality of bumps in the shape of a corrugated and bent plate so as to absorb vibration from an axial direction and act as an elastic body.

Figure 3:
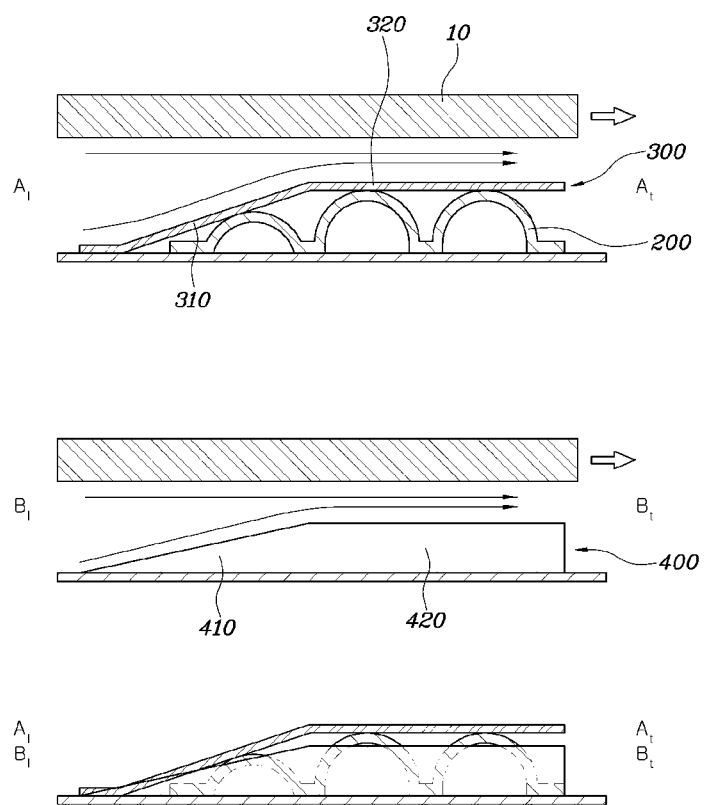
FIG. 3 is a cross-sectional side view of a thrust collar, the top foil, and the metal block according to an exemplary embodiment of the present invention.

The panel-like top foil 300 is disposed on each of the bump foils 200 so as to abut the top end of the bump foil 200 and cover the bump foil 200. In addition, the top foil 300 faces a thrust collar 10 positioned in the opposing direction. Accordingly, as shown in FIG. 3, when a load is exerted axially to the top surface of the top foil 300 from the thrust collar 10, the bump foil 200 positioned below the top foil 300 supports the top foil 300.

As shown in FIG. 2, each of the top foils 300 may include an inclined portion 310 having an inclination formed upwardly along a certain distance from the top surface of the thrust plate 100, of which one end is fixed to the top surface of the thrust plate 100, and an extension portion 320 extended from the inclined portion 310 of the top foil 300 to be inclined smaller than the inclination of the inclined portion 310 of the top foil 300. Preferably, it may be extended in parallel with the top surface of the thrust plate 100. The inclined portions 310 of the plurality of top foils 300 are all formed with a constant inclination in either a clockwise or counterclockwise direction.

The end of the inclined portion 310 of the top foil 300 may be fixed to the top surface of the thrust plate 100 by means of welding, preferably spot welding.

Gas introduced through between the thrust collar 10 and the inclined portion 310 of the top foil 300 forms gas fluid film having hydrodynamic pressure, thereby supporting the load exerted in the axial direction.

Figure 4:
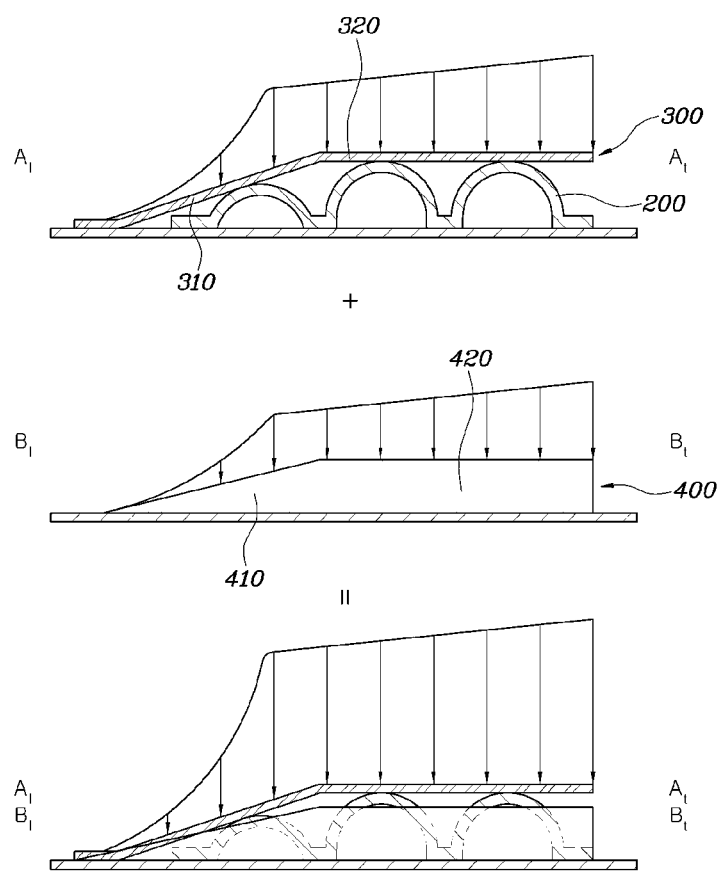
FIG. 4 is a cross-sectional side view showing a state that a load is applied to the top foil and the metal block according to an exemplary embodiment of the present invention.

However, as shown in FIG. 4, since it is necessary for the bearing to act as an additional gas dynamic pressure rigid bearing so as to increase the load bearing capacity and at the same time prevent permanent deformation of the bump foil 200 when the higher load is applied to the bearing, metal blocks 400 are disposed on the top surface of the thrust plate 100 at positions where they do not interfere with the bump foils 200 and the top foils 300.

As shown in FIGS. 3 and 4 showing side cross sections taken along lines $A_1$-$A_t$ and $B_1$-$B_t$ in FIG. 1, the metal block 400 does not act to support the load when the load is lower than a predetermined load, but act as an additional load supporting body when the higher load is applied to such an extent that the bump foil 200 and the top foil 300 are deformed over a certain level, thereby acting as a stopper for increasing the load bearing capacity and preventing excessive deformation of the bump foil 200.

Each of the metal blocks 400 may be composed of metal such as steel, aluminum, or magnesium, etc. However, the material of the metal block 400 is not limited to such material.

Each of the metal blocks 400 may include an inclined region 410 having an inclination formed upwardly along a certain distance from the top surface of the thrust plate 100 in the same manner as the top foils 300, and an extension region 420 extended from the inclined region 410 of the metal block 400 to be inclined smaller than the inclination of the inclined region 410 of the metal block 400. Preferably, it may be extended in parallel with the top surface of the thrust plate 100. The inclined regions 410 of the plurality of metal blocks 400 are all formed with a constant inclination in either a clockwise or counterclockwise direction.

In order for the metal block 400 to act as a stopper when the bump foil 200 and the top foil 300 are deformed over the certain level, the metal block 400 may be divided into an inclined region 410 having an inclination formed along a certain distance and an extension region 420 extended from the inclined region in the same manner in the same manner of the top foil 300.

Further, the metal block 400 may be paired with the top foil 300, the inclined region 410 of the metal block 400 may be formed at a position corresponding to the inclined portion 310 of the top foil 300 paired with the metal block 400, and the extension region 420 of the metal block 400 may be formed at a position corresponding to the extension portion 320 of the top foil 300 paired with the metal block 400.

Accordingly, each of the metal blocks 400 is paired with each of the bump foil 200 and the top foil 300 and disposed at a position corresponding thereto on the thrust plate 100. As a result, every metal block 400 protects against excessive deformation of one bump foil 200.

As the metal block 400 is formed into the shape similar to the top foil 300, hydrodynamic pressure is also generated between the metal block 400 and the thrust collar 10 when a heavy load is applied, so that additional load bearing capacity is generated. As a result of the additional load bearing capacity, an effect of increased stability at high speeds may be expected.

More preferably, the inclination of the inclined region 410 of the metal block 400 may be formed to be smaller than the inclination of the inclined portion 310 of the top foil 300 so that a height of the extension region 420 of the metal block 400 may be lower than that of the extension portion 320 of the top foil 300.

When the load lower than the predetermined is applied, only the bump foil 200 and the top foil 300 support the load, but the metal block 400 does not act to support the load. Thereafter, when the higher load is applied from the thrust collar 10, the bump foil 200 and the top foil 300 are gradually deformed so as to lower their heights, and then the heights become substantially equal to the height of the metal block 400. After that time, the metal block 400 acts as an additional load supporting body, thereby increasing the load bearing capacity of the thrust bearing.

Figure 5:
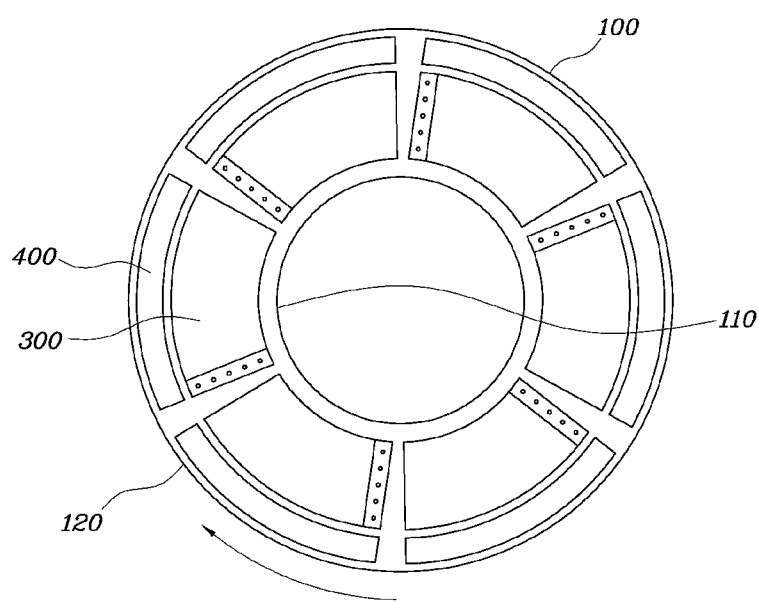
FIG. 5 is a view showing a configuration that the metal blocks are disposed on the thrust plate according to an exemplary embodiment of the present invention.

On the other hand, as shown in FIG. 5, the metal blocks 400 may be spaced apart from the bump foils 200 respectively in a direction of the outer diameter 120 of the thrust plate 100 and disposed along the outer diameter 120 of the thrust plate 100.

The metal blocks 400 are disposed on the outer diameter 120 side of the thrust plate 100 circumferentially along the outer diameter 120 in such a manner that they correspond to and are spaced apart from the bump foil 200 and the top foil 300 with a certain distance, and act as an additional load supporting body to protect against excessive deformation of the bump foil 200 disposed on the inner side thereof.

Figure 6:
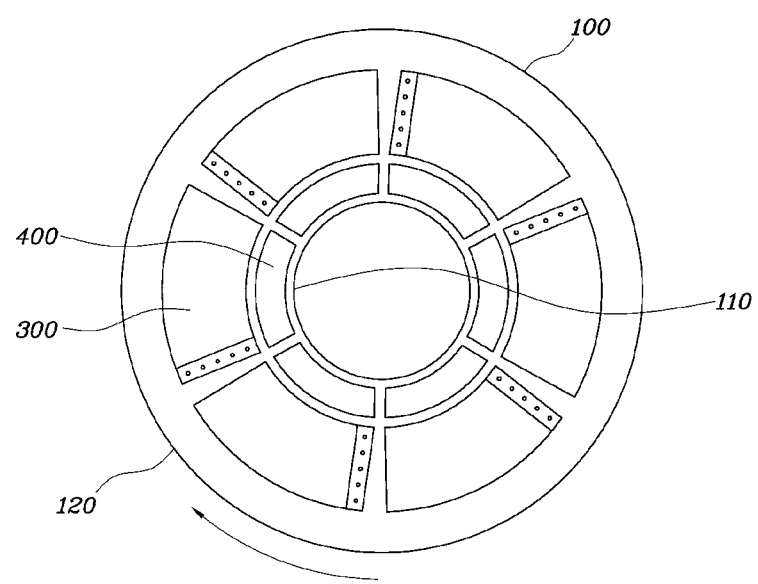
FIG. 6 is another view showing a configuration that the metal blocks are disposed on the thrust plate according to an exemplary embodiment of the present invention.

On the other hand, as shown in FIG. 6, the metal blocks 400 may be spaced apart from the bump foils 200 respectively in a direction of the inner diameter 110 of the thrust plate 100 and disposed along the inner diameter 110 of the thrust plate 100.

The metal blocks 400 are disposed on the inner diameter 110 side of the thrust plate 100 circumferentially along the inner diameter 110 in such a manner that they correspond to and are spaced apart from the bump foil 200 and the top foil 300 with a certain distance, and act as an additional load supporting body to protect against excessive deformation of the bump foil 200 disposed on the outer side thereof.

Preferably, the metal blocks 400 may be spaced apart from the bump foils 200 respectively in both directions of the inner and outer diameters 110 and 120 of the thrust plate 100 and disposed along the inner and outer diameters 110 and 120 of the thrust plate 100.

Figure 7:
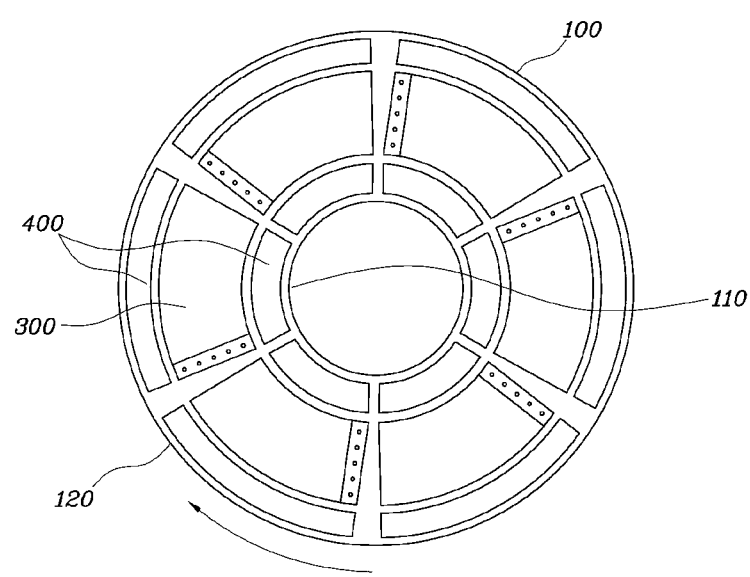
FIG. 7 is a further view showing a configuration that the metal blocks are disposed on the thrust plate according to an exemplary embodiment of the present invention.

As shown in FIG. 7, the metal blocks 400 are disposed on both the outer diameter 120 side and the inner diameter 110 side of the thrust plate 100 circumferentially along the outer diameter 120 and the inner diameter 110 in such a manner that they correspond to and are spaced apart from the bump foil 200 and the top foil 300 with a certain distance, and act as an additional load supporting body to protect against excessive deformation of the bump foil 200 disposed on the inner and outer sides thereof. Since the metal block 400 acts as a stopper at both sides of the bump foil 200 and the top foil 300, an effect of preventing excessive deformation of the bump foil 200 can be reliably achieved.

Although the present invention has been described and illustrated with respect to specific embodiments, it will be apparent by those who have ordinary skill in the art that various modifications and changes to the present invention may be made without departing from the spirit and scope of the present invention as defined in the appended patent claims.

What is claimed is:

1. A thrust bearing, comprising:
   a thrust plate in a disc shape having an outer diameter and an inner diameter formed by perforating a central portion of the thrust plate;
   a plurality of bump foils disposed radially on a top surface of the thrust plate;
   a plurality of top foils covering each of the bump foils, wherein bottom surfaces of the top foils are in contact with upper ends of the bump foils; and
   metal blocks radially disposed on the top surface of the thrust plate and formed to be spaced apart from the bump foils,
   wherein each of the metal blocks includes an inclined region having an inclination formed upwardly along a certain distance from the top surface of the thrust plate, and an extension region extended from the inclined region of the metal block to be inclined smaller than the inclination of the inclined region of the metal block.

2. The thrust bearing of claim 1, wherein each of the top foils includes an inclined portion having an inclination formed upwardly along a certain distance from the top surface of the thrust plate, of which one end is fixed to the top surface of the thrust plate, and an extension portion extended from the inclined portion of the top foil to be inclined smaller than the inclination of the inclined portion of the top foil.

3. The thrust bearing of claim 1, wherein the metal block is paired with the top foil, the inclined region of the metal block is formed at a position corresponding to the inclined portion of the top foil paired with the metal block, and the extension region of the metal block is formed at a position corresponding to the extension portion of the top foil paired with the metal block.

4. The thrust bearing of claim 1, wherein the inclination of the inclined region of the metal block is formed to be smaller than the inclination of the inclined portion of the top foil so that a height of the extension region of the metal block is lower than that of the extension portion of the top foil.

5. The thrust bearing of claim 1, wherein the metal blocks are spaced apart from the bump foils respectively in a direction of the outer diameter of the thrust plate and disposed along the outer diameter of the thrust plate.

6. The thrust bearing of claim 1, wherein the metal blocks are spaced apart from the bump foils respectively in a direction of the inner diameter of the thrust plate and disposed along the inner diameter of the thrust plate.

7. The thrust bearing of claim 1, wherein the metal blocks comprise first metal blocks spaced apart from the bump foils in the direction of the outer diameter and disposed along the outer diameter of the thrust plate and second metal blocks spaced apart from the bump foils in the direction of the inner diameter and disposed along the inner diameter of the thrust plate.

* * * * *